219-121 SR
8/23/83 XR 4,400,611

United States Patent [19]
Wilkinson
[11] 4,400,611
[45] Aug. 23, 1983

[54] WELDING AT PRESSURES GREATER THAN ATMOSPHERIC PRESSURE

[75] Inventor: Michael E. Wilkinson, Linton, England

[73] Assignee: The Welding Institute, England

[21] Appl. No.: 206,861

[22] Filed: Nov. 14, 1980

Related U.S. Application Data

[63] Continuation of Ser. No. 939,277, Sep. 5, 1978, abandoned.

[30] Foreign Application Priority Data

Jul. 4, 1978 [GB] United Kingdom ............... 28709/78

[51] Int. Cl.[3] ............................................. B23K 9/16
[52] U.S. Cl. ......................... 219/137 R; 219/121 PK; 219/121 PY; 219/61; 219/74; 219/72
[58] Field of Search ............... 219/137 R, 76.16, 76.1, 219/74, 75, 121 PR, 121 PS, 121 PJ, 121 PK, 60 R, 61

[56] References Cited

U.S. PATENT DOCUMENTS

| | | | |
|---|---|---|---|
| 3,969,603 | 7/1976 | Boughton et al. | 219/74 |
| 4,035,602 | 7/1977 | Berghof | 219/74 |
| 4,052,632 | 10/1977 | Sagara et al. | 219/137 R |
| 4,154,999 | 5/1979 | Pinfold et al. | 219/74 |

OTHER PUBLICATIONS

"Semiautomatic Underwater Welding", Dr. of Technical Sciences, Shliamin et al., U.S.S.R., Underwater Digest.
Welding Handbook, pp. 3.39, 3.40, 6th edition, Section 1.

*Primary Examiner*—M. H. Paschall
*Attorney, Agent, or Firm*—Martin Novack

[57] ABSTRACT

When metal inert gas (MIG) welding is carried out at normal atmospheric pressure, the electrode is made positive with respect to the workpiece because the use of a negative electrode gives little penetration. In undersea welding, as the pressure increases the arc stability and metal transfer in MIG welding become erratic and there is copious fume evolution. According to the present invention, MIG welding at pressures greater than 7 bars is carried out with the electrode negative with respect to the workpiece and with an electrode wire of diameter not greater than 1.4 mm; the slope of the power supply, as seen from the welding arc, is preferably between 6 and 15 V/100 A, which is higher than the 3 to 4 V/100 A used in positive-electrode MIG welding at normal atmospheric pressure.

5 Claims, 2 Drawing Figures

WELDING AT PRESSURES GREATER THAN ATMOSPHERIC PRESSURE

Figure 1:
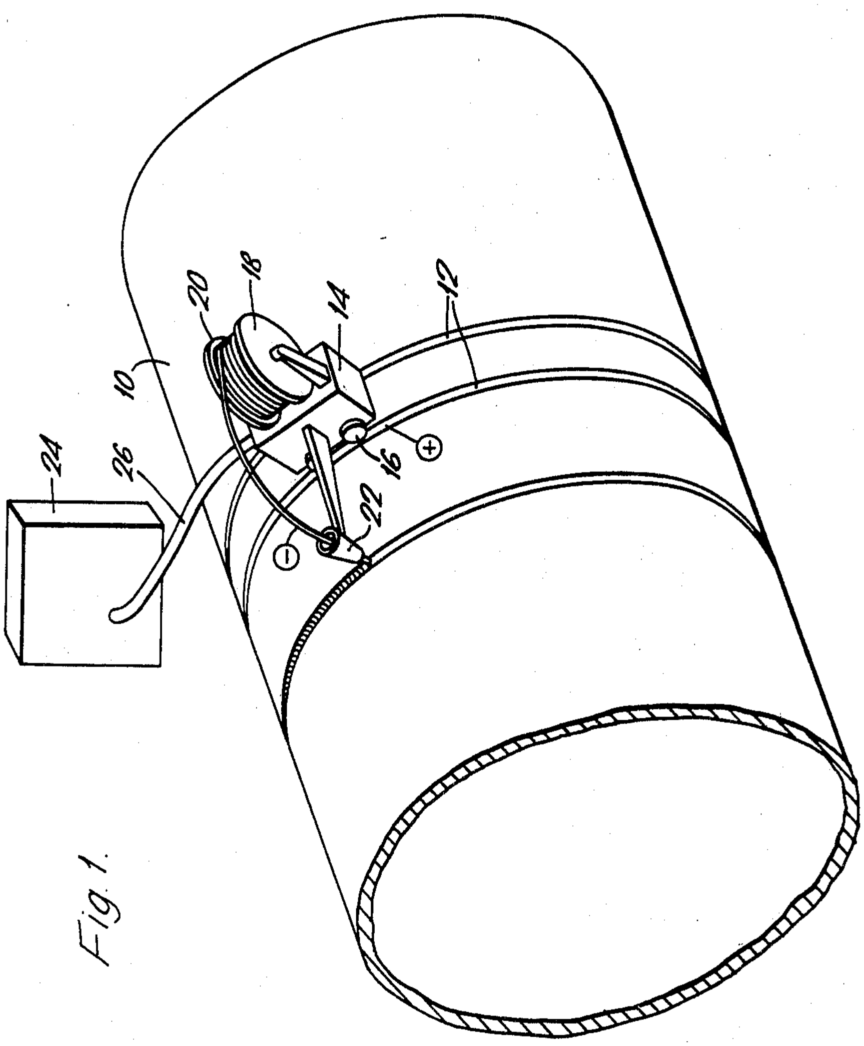

This application is a continuation of application Ser. No. 939,277, now abandoned, filed Sept. 5, 1978.

This invention relates to welding under conditions of high pressure, for example welding pipelines on the seabed. Some of the welding processes which are used in normal ambient conditions have been tried successfully for underwater welding. Normally for quality welds at any depth in order to remove water from the weld pool and arc, the welding process is surrounded by an inert gas envelope, contained in a small transparent enclosure. At depths below the air diving range (164 ft. 50 m, or 6 bars pressure) the welder or some part of the welder is usually enclosed in the inert gas envelope with the materials needed for the welding process and the joint to be welded. As depth increases, the pressure on the arc increases.

Flux-shielded arc welding processes and in particular the manual metal arc process and the flux-cored wire process, have been used with success down to 50 m, which is equivalent to a pressure of about 6 bars. However, at depths beyond this changes occur in complex slag, metal or gas reactions that take place in the arc, leading to changes in the deposited weld metal composition, that in turn affect the mechanical properties of the weld. Arc stability however is maintained.

Conventional metal inert-gas welding can also be used at shallow depths but beyond 50 m arc stability and metal transfer become erratic, with the result that large globules of weld metal are thrown from the end of the electrode on the plate surrounding the weld pool. In addition, whilst at atmospheric pressure there is little fume evolution in metal inert-gas welding, at pressures above 6 bars there is copious fume evolution and this is obviously a severe problem in underwater welding.

These difficulties with metal inert-gas welding have led to the use at depths of processes utilising flux for stabilisation and metal modification, despite the advantages that metal inert-gas welding provides in the form of a high deposition rate and a lack of complex slag, metal or gas reactions.

In a method of welding according to the present invention, at pressures greater than 7 bars, a metal inert gas process is used with the electrode negative with respect to the workpiece and with an electrode wire of diameter not greater than 1.4 mm; in the preferred method embodying the invention, the slope of the power supply, as seen from the welding arc, is between 6 and 15 V/100 A. This slope is higher than the slope normally used in MIG welding, which is about 3 to 4 V/100 A. We have found that the use of such a higher slope improves the stability of the process and allows increased penetration to be achieved in the weld. The preferred slope is 7 V/100 A. The term "slope" is here used in the generally accepted sense to mean a negative slope.

Above a pressure of 10 bars, the advantages of the invention are even more apparent.

Preferably, the inert gas is predominantly argon or helium. An oxidising gas such as oxygen or carbon-dioxide may be added to the inert gas. A suitable mixture is one that contains at least 95% of argon or helium and up to 5% of oxygen or carbon dioxide.

In this specification, the expression "conventional metal inert gas welding" is intended to mean solid bare-wire metal inert-gas welding and in such a welding process carried out at normal atmospheric pressure, it is customary to make the electrode positive. The reason for this is that in this form of welding, the majority of the heat is generated at the cathode, i.e. the negative workpiece and this permits good penetration to be achieved and an adequate transfer of metal from the consumable electrode. If the electrode were made negative, little heat would be generated at the workpiece and there would be little penetration; the majority of heat generation would take place at the electrode end, causing the melting of too much of the electrode with the result that the arc would tend to run back to the copper guide tube surrounding the electrode. Thus when the electrode is made negative at normal atmospheric pressure there is a very high deposition rate on the surface of the workpiece but the arc may have poor stability and there is little penetration.

Metal inert-gas welding with a negative electrode has had little practical use, because of the disadvantages set out above, although some mitigation of these disadvantages can be achieved with the use of an argon-rich gas containing some oxygen or $CO_2$.

It has also been proposed to use an AC current for metal inert-gas welding, the positive electrode half-cycles stabilising the arc and the negative electrode half-cycles heating the wire.

The conditions necessary to achieve a balance between the amount of metal melted from the electrode wire and the amount of energy at the workpiece in a metal inert-gas welding process vary with the pressure under which the weld is carried out. Using the conventional metal inert gas welding technique, as the pressure in which the process is carried out increases above atmospheric pressure, a condition is produced which leads to the fume and stability problems discussed above. However, with the same increase in pressure, the alteration of the above-mentioned balance acts in favour of electrode-negative working, so that at the above-mentioned pressure of 7 bars it becomes preferable to use electrode-negative working and at a pressure of 14 bars the use of electrode-negative working is highly advantageous. As an example, stable arcs with little spatter and with a relative absence of fume can be produced even at a pressure in excess of 32 bars (equivalent to 310 m of depth).

MIG welding generally requires a flat characteristic. One way of increasing the power supply slope (as seen from the arc) is by increasing the length of the leads between the power supply and the welding head. In this way, the use of a method embodying the invention permits locating the power source on the ship, the long leads on the ship to the undersea welding site giving stability to the welding process. Another way of increasing the power supply slope, as seen from the arc, is to increase the resistance between the power supply and the welding head by reducing the diameter of the cable connection or by reducing the number of cables, where several cables are used in parallel. The same result can also be achieved by increasing the inductance between the power supply and the welding head, because over the short period of time for which the arc demands rapid changes of voltage and current, the effect of the inductance on the apparent power supply slope, as viewed from the arc, will be the same as the effect of the previously proposed increase in resistance. The inductance can be introduced by increasing the number of parallel connecting cables or by including an inductive component in the leads.

The increased slope also assists the first run in a welding operation, which is very difficult in conditions of high pressure in that there is a tendency for the weld to burn through. The tolerance in the choice of root gap is also improved and narrow-gap welding can be employed, for example, welding with an included joint angle of 30°, in any position. Generally speaking, this was not possible in air, especially in an overhead position, with one-millimeter diameter wire, as it was difficult to ensure adequate sidewall fusion. Narrow-gap welding reduces welding time.

A further advantage of the use of metal inert-gas welding in underwater conditions is that as it employs a continuous electrode it lends itself to mechanisation. The limit of welding by divers has now been practically reached in the sense that at the depths now envisaged a diver requires a very long period of decompression. Consequently to weld at greater depths mechanised processes will be highly desirable.

It is not necessary to vary the weld metal composition with pressure.

Figure 2:
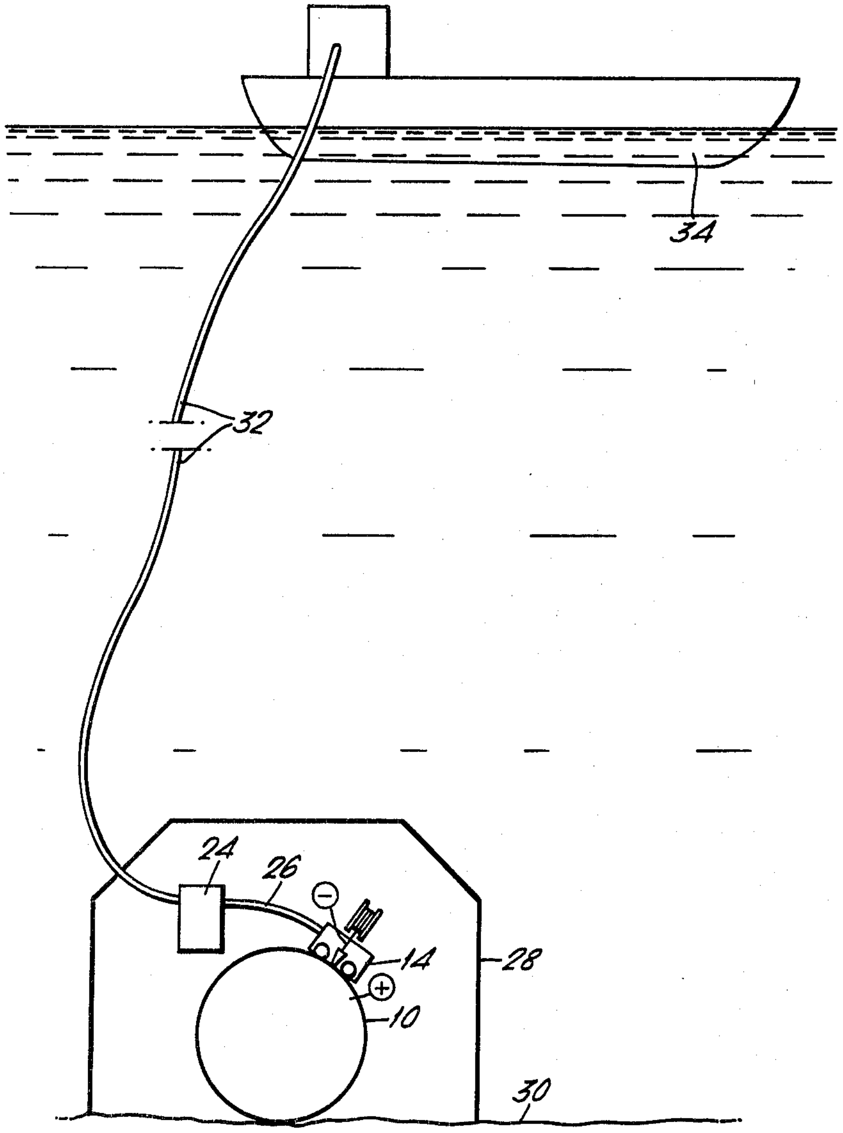

One example of apparatus embodying the invention for undersea welding will now be described with reference to the accompanying drawings, in which:

FIG. 1 is a perspective view of automatic MIG welding apparatus performing a pipe-welding operation; and FIG. 2 shows the apparatus located in an enclosure on the seabed and electrically connected to a power source on a surface ship.

In the drawings, 10 represents a pipe to be welded formed with tracks 12 for guiding a trolley 14 provided with wheels 16. The trolley 14 carries a reel 18 on which is wound consumable electrode wire having a diameter of 1 mm or less. The end of the electrode wire passed through a welding head 22 supported by the trolley 14. The trolley 14 houses the driving systems for the wheels 16 and the reel 18. Electrical supplies for these driving systems and for the welding arc are provided from a box 24 through a cable 26. The box 24 may include an oscillation control system for the welding head together with a local power source in which case the power source has a slope of between 6 and 15 V/100 A. Alternatively, as shown in FIG. 2, the box 24 located with the trolley 14 in an enclosure 28 on the seabed 30, includes the oscillation control system and also serves to couple the cable 26 to a further cable 32 and thence to a power source on the ship 34. In the latter case, the slope of the power supply means including the shipborne power source and the cable connecting this power source to the welding arc, is between 6 and 15 V/100 A. Additionally, the connections between the power source and the electrode wire are such that the electrode wire is electrically negative with respect to the pipe 10 during the welding operation.

In one series of welding trials, carried out at pressures of 7, 14 and 32 bars and in overhead, vertical and flat positions, the following were maintained constant throughout:

1. Base plate—BS 4360 Grade 50D
2. Plate Thickness—19 mm
3. Joint Type—One sided single V butt, 60° included angle.
4. Root face—1.6±0.6 mm.
5. Root gap—2.0±1.0 0.5 mm
6. Process—MIG
7. Polarity—DC electrode negative
8. Filler—BS 2901 part 1 A18
9. Filler diameter—0.9 mm
10. Power source—500 A solid state
11. Open circuit voltage—45 V
12. V/A slope—7 V/100 A
13. Circuit lead length—4 m
14. Added circuit inductance—nil
15. Welding nozzle dia.—12.5 mm.
16. Contact tip/work distance—10-15 mm
17. Shielding gas flow rate—10-15 l/min at working pressure.
18. Shielding gas composition—
    7 bars—argon/2% oxygen
    14 bars—argon/1% oxygen
    32 bars—argon/0.5% oxygen
19. Interrun cleaning and grinding—nil.
20. Interpass time—5-10 min.

An analysis of the base plate metal BS4360 Grade 50D gave the following percentages by weight: C 0.14; S 0.012; P 0.020; Si 0.35; Mn 1.43; Cu 0.02; Nb 0.035; Al 0.021; O 0.0178; N 0.0093.

An analysis of the filler wire BS2901 give the following results in percentages by weight: C 0.09; S 0.029; P 0.022; Si 0.94; Mn 1.55; Cu 0.24; Nb<0.005; Al 0.007; O 0.0053; N 0.0073. For the overhead position 6 passes were made; for the flat and vertical positions there were 7 passes. In each case for the root run the wire feed speed was 5 meters/minute and the travel speed 200 mm/minute: for the other passes the wire speed was 7.1 meters/minute and the travel speeds were between 110 and 80 mm/minute. The oscillation width progressively increased from the 10 mm in the second pass to 22 mm for the seventh pass for the flat and vertical positions, while for the second to sixth passes in the overhead position the oscillation widths were 7, 13, 13, 14 and 10 mm respectively. The oscillation frequencies were between 15.4 and 21.4 oscillations per minute. No oscillation was used for the root run. The metal deposition rate for the root runs was 1.5 kg/Hr and for the other passes 2.05 kg/Hr.

The results of weld metal Charpy impact tests for the welds made were as follows, the value in Joules in each case being the average of the values for three welds.

| | | Temperature °C. | | |
|---|---|---|---|---|
| | Pressure | 0 | −10 | −30 |
| Position | (bars) | Joules | Joules | Joules |
| Overhead | 7 | 118 | 56 | 50 |
| " | 14 | 59 | 57 | 31 |
| " | 32 | 66 | 68 | 50 |
| Vertical | 7 | 100 | 78 | 55 |
| " | 14 | 90 | 81 | 55 |
| " | 32 | 90 | 67 | 54 |
| Flat | 7 | 76 | 79 | 46 |
| " | 14 | 81 | 71 | 54 |
| " | 32 | 80 | 50 | 46 |

I claim:

1. A welding method comprising connecting a solid uncoated consumable electrode wire, having a diameter not greater than 1.4 mm, and workpiece to opposite poles of an electrical power supply having a slope, as seen from the welding arc, of between (6-15) V/100 A to form an arc between the electrode and the workpiece and thereby to transfer metal from the electrode to the workpiece, providing an inert gas shield around the arc at the workpiece, and advancing the electrode towards the workpiece at a rate which matches the consumption of the electrode; and further comprising carrying out the welding method at a pressure of at least 7 bars and connecting the power supply so that the electrode is negative with respect to the workpiece.

2. A method in accordance with claim 1, carried out at a pressure greater than 10 bars.

3. A method in accordance with claim 1 or 2, in which the diameter of the electrode wire is not greater than 1.0 mm.

4. A method in accordance with claim 1, in which the welding is carried out on the seabed and in which the power source is carried on a surface vessel, the slope of the power supply,including the power source and a cable connecting the power source to a welding head on the seabed, lying within the said range.

5. A method in accordance with claim 1 or 5, in which the inert gas is predominantly argon.

* * * * *